Figure 1:
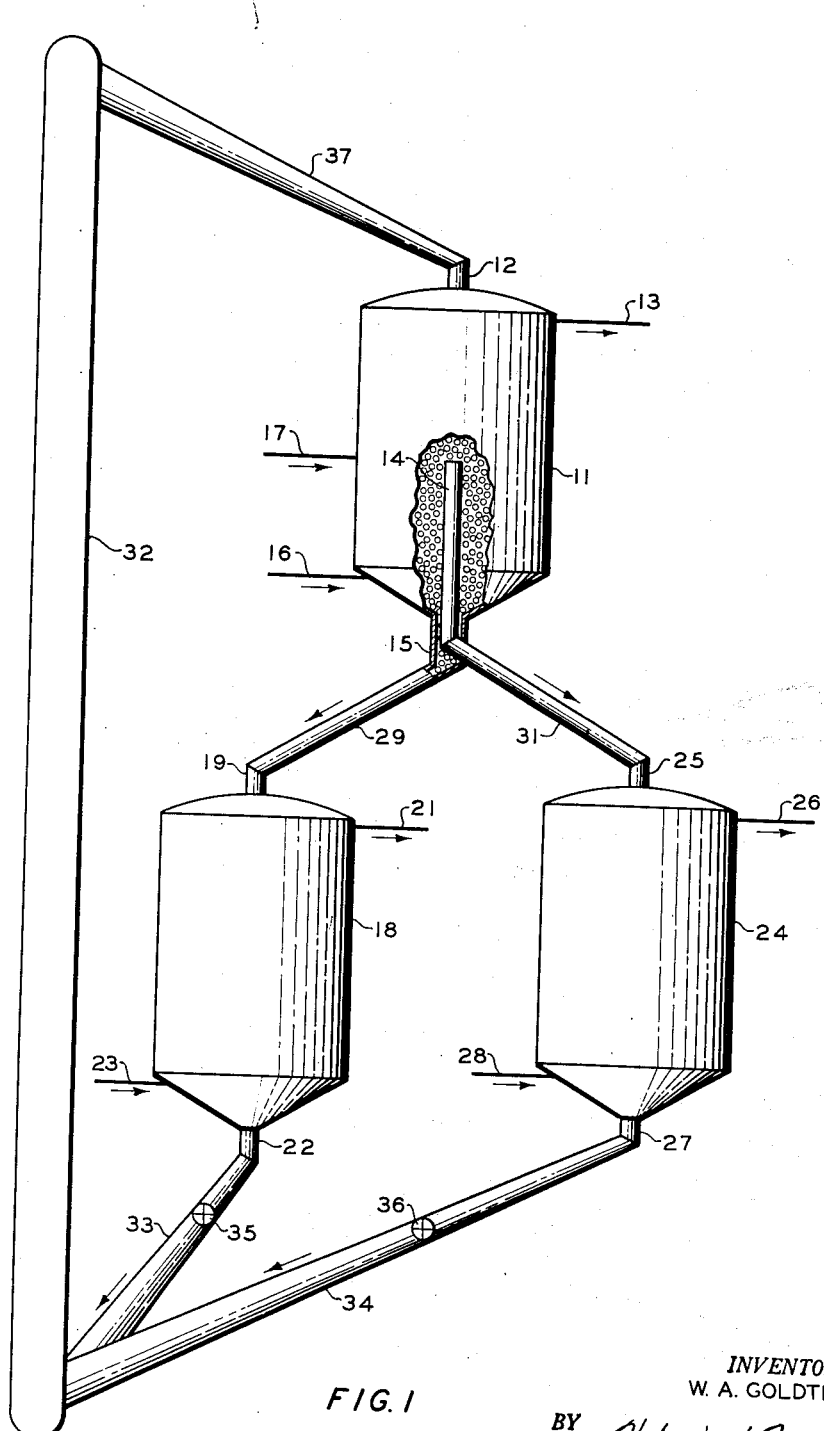

March 2, 1954 W. A. GOLDTRAP 2,671,122
MULTIREACTOR PEBBLE HEATER PROCESS AND APPARATUS
Filed June 13, 1949 2 Sheets-Sheet 1

INVENTOR.
W. A. GOLDTRAP
BY Hudson and Young
ATTORNEYS

March 2, 1954

W. A. GOLDTRAP 2,671,122

MULTIREACTOR PEBBLE HEATER PROCESS AND APPARATUS

Filed June 13, 1949

2 Sheets-Sheet 2

INVENTOR.
W. A. GOLDTRAP

BY Hudson and Young

ATTORNEYS

Patented Mar. 2, 1954

2,671,122

UNITED STATES PATENT OFFICE 2,671,122

MULTIREACTOR PEBBLE HEATER PROCESS AND APPARATUS

Walter A. Goldtrap, Bartlesville, Okla., assignor to Phillips Petroleum Company, a corporation of Delaware Application June 13, 1949, Serial No. 98,848

12 Claims. (Cl. 260—683)

This invention relates to pebble heater apparatus. In one of its more specific aspects it relates to improved multi-reactor pebble heater apparatus. In another of its more specific aspects it relates to means for supplying pebbles to different reaction zones at different temperatures.

Thermal conversion processes which are carried out in so-called pebble heater apparatus utilize a flowing mass of solid heat exchange material, which pebble mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at its lower end and at its periphery and are sometimes introduced through a refractory arch which supports the moving pebble bed. Another means of heating the pebble material is to inject fuel material onto the surface of the pebbles in the lower portion of the heater chamber, burning the fuel on the surface of the pebbles so as to impart heat to those pebbles, and passing the resulting hot combustion gas upwardly through the remainder of the pebble bed, thus imparting additional heat to those pebbles. A solid heat exchange material is ordinarily drawn from substantially a central point in the lower portion of the pebble bed and is passed downwardly into a gas heating chamber where a second moving bed of solid heat exchange material is formed.

The materials which are required for the construction of a pebble heater chamber are necessarily of the highest type refractory material. Construction of such pebble heater chambers is therefore rather expensive and considerable maintenance expense is encountered. Broadly speaking, this invention provides a single pebble heater chamber for use in connection with a plurality of gas heating or reactor chambers so as to maintain each reaction chamber at a different temperature.

Another disadvantage of conventional pebble heater chambers is that it is most difficult to establish uniform flow of uniformly heated solid heat exchange material from the pebble heating chamber to the gas heating chamber. In the withdrawal of solid heat exchange material from a substantially central point in the bottom of a pebble heating chamber, the moving solid heat exchange material tends to form a cone. That material which is below and outside of the cone remains in what is substantially a stagnant area. At the same time, when solid heat exchange material is introduced centrally into the upper portion of the pebble heating chamber, heat exchange material forms an inverted cone extending downwardly and outwardly from the material inlet to the walls of the chamber. It will thus be seen that the pebble bed is of lesser thickness at the periphery than at its axis because of the fact that the top of the pebble bed is formed in the shape of a cone. The hot gaseous heat exchange material which is introduced at the bottom of the solid material bed seeks a path of least resistance upwardly through the solid material. Inasmuch as the bed is thinner at its periphery than at its axis, the gas tends to channel through that material making up the periphery of the solid material bed, thus imparting heat to the material at the periphery of the bed while failing to raise the central portion of the solid material bed to the same temperature. The solid material which comes to rest in the stagnant areas once raised to the temperatures of the hot gaseous heat exchange material fails thereafter to enter substantially into heat exchange relation with the hot gaseous material. It will thus be seen that the hot gaseous materials pass through an even thinner layer of solid material which will enter into a heat exchange relation therewith. For the reasons above described, large amounts of heat are lost by escape of the gaseous heat exchange material from the pebble heating chamber without its having imparted a maximum of its heat to the solid material bed. A modification of the present invention makes it possible to efficiently utilize the heat of the combustion gas in a chamber of smaller diameter than is ordinarily used without materially increasing the depth of the pebble bed therein.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles which may suitably be used in pebble heater apparatus are substantially spherical in shape and range from about one-eighth inch to about one inch in diameter. In a high temperature process, pebbles having a diameter of one-fourth inch to three-eighths inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be used to form such pebbles. Silicon carbide, alumina, periclase, beryllia, thoria, Stellite, zirconia, and mullite are satisfactorily used in the formation of such pebbles and may be used in admixture with each other or with other materials. Pebbles formed of such materials, when properly fired, serve very well in high temperatures. Mullite-alumina pebbles, in particular, withstand high temperatures, some such pebbles withstanding temperatures up to 3500° F. and above. Pebbles which are used may be either inert or catalytic as used in any selected process.

An object of this invention is to provide means for carrying on two separate simultaneous reactions in which heat required for the reaction is supplied by hot pebbles. Another object of the invention is to provide an improved method for providing hot pebbles for a plurality of separate simultaneous reactions which are carried on at different temperatures. Another object of the invention is to provide improved means for providing hot pebbles for a plurality of separate simultaneous reactions which are carried on at different temperatures. Another object of the invention is to provide means for supplying pebbles from a single pebble heater chamber at different temperatures. Another object of the invention is to provide a pebble heater apparatus wherein uniformity of pebble flow may be increased in the pebble heater chamber without increasing the pebble bed depth therein. Other and further objects and advantages will be apparent upon study of the accompanying discussion and the drawings.

Figure 2:
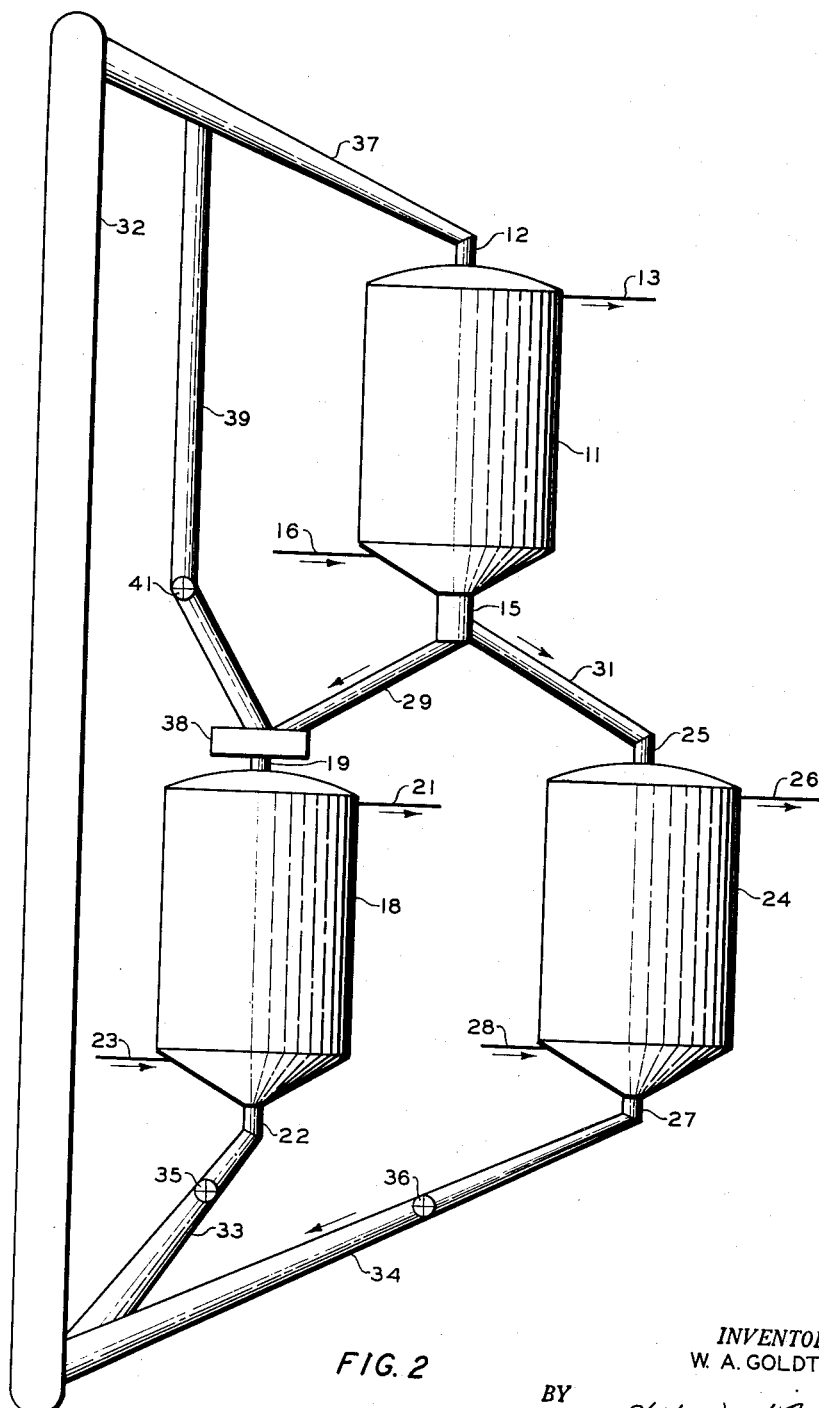

Understanding of the invention will be facilitated upon reference to the diagrammatic drawings in which Figure 1 is a plan view of pebble heater apparatus of this invention. Figure 2 is a plan view of a preferred modification of the invention.

Referring particularly to Figure 1 of the drawing, pebble heater chamber 11 is provided in its upper portion with a pebble inlet conduit 12 and an effluent outlet conduit 13. Pebbles are passed into the upper portion of pebble heater chamber 11 through pebble inlet conduit 12 and flow downwardly and outwardly therefrom to form a fluent pebble mass within chamber 11. Extending upwardly through the bottom portion of chamber 11 to a position intermediate the ends of that chamber is pebble outlet conduit 14. Pebble outlet conduit 15 is provided in the bottom of chamber 11 and when conduit 14 extends axially into chamber 11, conduit 15 is maintained about conduit 14 so as to form an annular space therebetween. Conduit 14 may extend into chamber 11 at an angle, though for the purpose of best pebble flow, such construction is not preferred. If conduit 14 does extend into chamber 11 at an angle, however, conduit 15 extends downwardly from a central position in the bottom of chamber 11 entirely separate from conduit 14. Conduit 16 is provided so as to supply heating material to the lower portion of pebble heating chamber 11. Although the diagrammatic showing of the drawing shows only the extension of conduit 16 into the lower portion of chamber 11 at a single point, conduit 16 may extend around the lower portion of chamber 11 and communicate therewith so as to provide heating material to the chamber at a plurality of points. A second conduit 17 is provided intermediate the ends of chamber 11 and substantially on a plane with the upper end of pebble outlet conduit 14 so as to provide additional heating material to the pebble mass if so desired. A first reaction chamber 18 is provided in its upper end portion with a pebble inlet conduit 19 and an effluent outlet conduit 21. Chamber 18 is provided in its lower end portion with pebble outlet conduit 22 and reactant material inlet conduit 23. A second reaction chamber 24 is provided in its upper end portion with pebble inlet conduit 25 and effluent outlet conduit 26. That chamber also is provided in its lower end portion with pebble outlet conduit 27 and reactant material inlet conduit 28. Pebble conduit 29 extends between pebble outlet conduit 15 of pebble heater chamber 11 and pebble inlet conduit 19 of reaction chamber 18. Pebble conduit 31 extends between pebble outlet conduit 14 of pebble heater chamber 11 and pebble inlet conduit 25 of reaction chamber 24. Elevator 32 is provided to elevate pebbles from reaction chambers 18 and 24 to the upper portion of pebble heater chamber 11. Pebble conduit 33 extends between pebble outlet conduit 22 of reaction chamber 18 and the lower portion of elevator 32. Pebble conduit 34 extends between pebble outlet conduit 27 of reaction chamber 24 and the lower portion of elevator 32. Flow control means 35 and 36 are provided in conduits 33 and 34, respectively, so as to control the flow of pebbles through reaction chambers 18 and 24. Although the flow control means is diagrammatically shown in the drawing as a star valve, other types of flow control means, such as rotatable tables and slidable valves, are used with great success. Pebble conduit 37 extends between the upper portion of elevator 32 and pebble inlet conduit 12 of pebble heater chamber 11.

In the operation of the device schematically shown as Figure 1 of the drawing, pebbles are supplied to pebble heater chamber 11 through pebble inlet conduit 12. Hot gaseous material is passed into the lower portion of pebble heater chamber 11 and upwardly therethrough in direct heat exchange relation with the pebbles which flow downwardly therethrough. The hot gaseous material may be hot combustion gas which is burned at a point outside of pebble heater chamber 11. An annular combustion chamber may be formed around the lower end of pebble heater chamber 11 adjacent the periphery of the chamber so as to provide combustion space to the lower portion of the pebble bed. A pebble heater chamber having a perforate refractory arch in its lower portion may be utilized so as to provide combustion space adjacent the pebble bed but directly below the bed. In such a construction conduit 15 extends upwardly to the perforate refractory arch and conduit 14 extends into chamber 11 to a point intermediate the refractory arch and the top of the chamber.

In one modification of the invention, fuel is injected into the lower portion of pebble heater chamber 11 directly onto the surface of the pebbles within the chamber. The fuel is ignited and burned on the surface of the pebbles and the resulting hot combustion gases flow upwardly through the fluent mass of pebbles within the heated chamber. The hottest pebbles in chamber 11 are adjacent the bottom end of the chamber and pebbles at successively higher positions in the chamber are at successively lower temperatures. The hottest pebbles are withdrawn from the bottom of pebble heater chamber 11 through pebble outlet conduit 15 and are passed by means of pebble conduit 29 to the upper portion of reaction chamber 18 through pebble inlet conduit 19. Pebbles which are at a lower temperature than those which are removed through outlet conduit 15 are removed from a position intermediate the ends of pebble heating chamber 11 through pebble outlet conduit 14 and are passed by means of conduit 31 into the upper portion of reaction chamber 24 through pebble inlet conduit 25. Gaseous materials which are to be heated, treated, or converted in reaction chambers 18 and 24 are passed into the lower portion of reaction chambers 18 and 24 through reactant material inlet conduits 23 and 28, and are passed through the respective reaction chambers at desired reaction conditions which are ordinarily different from one another.

The differences in temperature between the pebbles which are removed through pebble outlet conduits 15 and 14 may be considerably controlled by the injection of additional fuel or combustion gases into the pebble bed through heating material inlet conduit 17. Pebbles which have been cooled in the reaction chambers 18 and 24 are removed from the lower portions of those chambers and are passed by means of conduits 33 and 34 to the lower portion of elevator 32. The flow of pebbles from each reaction chamber is controlled by flow controls 35 and 36. The operation of flow controls 35 and 36 is in response to such variables as the temperature of effluent leaving the reaction chambers through outlet conduits 21 and 26 or in response to the temperature of pebbles leaving the chambers through pebble outlet conduits 22 and 27, or is operated in response to the temperature of pebbles admitted into chambers 18 and 24 as measured at pebble inlet conduits 19 and 25. The pebbles are elevated by elevator 32 and are passed by means of pebble conduit 37 into the upper portion of pebble heater chamber 11 through pebble inlet conduit 25.

In the devices shown in Figures 1 and 2 of the drawings, like parts are indicated by like numbers. In the operation of the device of Figure 2 of the drawings, hot pebbles are removed from the bottom of pebble heater chamber 11 through pebble outlet conduit 15 and a portion of those pebbles is passed by means of conduit 31 into the upper portion of the reaction chamber 24 through conduit 31 by means of pebble inlet conduit 25. A second portion of the heated pebbles from conduit 15 is passed by means of conduit 29 to mixing chamber 38. A portion of the cool pebbles which are being recycled through conduit 37 to the upper portion of pebble heater chamber 11 are removed from conduit 37 and are passed by means of conduit 39 to mixing chamber 38 where they are mixed with the heated pebbles from pebble heater chamber 11. A direct heat exchange takes place between the hot and cold pebbles within mixing chamber 38 whereby the cool pebbles are heated and the hot pebbles are cooled so as to reach a uniform temperature before being supplied to the upper portion of reaction chamber 18. The temperature of the pebbles which are supplied to reaction chamber 18 is controlled in this manner. The flow of cool pebbles through conduit 39 is controlled by flow control member 41. Flow control member 41 is preferably operated in response to the temperature of pebbles being passed into the upper portion of reaction chamber 18 as measured in pebble inlet conduit 19. Reaction materials are passed into the lower portion of reaction chambers 18 and 24 in the same manner as described in connection with Figure 1 of the drawings. The effluent material is removed from the upper portion of chambers 18 and 24 through outlet conduits 21 and 26. Flow of cooled pebbles from chambers 18 and 24 is maintained and controlled in a manner similar to that described in connection with the device of Figure 1 of the drawing. In the modification of Figure 2 the reaction which is carried on in chamber 18 will ordinarily have lower temperature conditions than will the reaction which is carried on in reaction chamber 24.

In this modification of the invention it will be seen that a pebble heater chamber which has a smaller diameter than would otherwise be necessary may be utilized to heat the pebbles for the purpose of supplying heat to the reaction chambers. A portion of the pebbles which would ordinarily be passed through a pebble heater chamber bypasses the pebble heater chamber and is supplied directly to the pebble stream which is supplied to reaction chamber 18. Thus, it is not necessary to increase the depth of the pebble bed when reducing the size of the chamber. Such an increase in pebble bed depth increases the pressure drop through the bed and requires more powerful pressurizing apparatus.

The bottom of pebble heater chamber 11 is preferably formed as a cone. The slope of the walls of the cone is preferably greater than the angle of slip, which is the term applied to the angle taken from a horizontal line passing through the inlet to the pebble outlet beneath which line pebbles are substantially stagnant and above which line pebbles are substantially all flowing. The angle of slip is approximately 70° for three-eighths inch alumina pebbles. The angle formed within the conical portion of the pebble heater chamber bottom is preferably between 60° and 100°. By reducing the diameter of the chamber it will be seen that the length of the cylindrical portion of the pebble bed is increased and the paths through which the hot gaseous material is caused to flow are thus caused to become more nearly uniform.

The device of this invention finds particular application in those reactions in which a plurality of feed stocks is to be utilized for the formation of a single product where the various feed stocks require different reaction conditions. The apparatus is also particularly advantageous in those reactions in which a single feed stock is to be utilized for the formation of a plurality of products, such reactions requiring different temperatures. This invention finds particular application in the cracking of ethane and propane to form ethylene. Ethane is cracked by maintaining the gas at temperature between 1300° F. and 2500° F. and at a pressure between 5 and 40 p. s. i. a. for a time ranging between 0.001 to 1.0 second. It is preferred that the ethane be cracked at a temperature between 1500° F. and 2000° F. at a pressure of between 5 and 25 p. s. i. a. while maintaining the gas under these conditions for a period of time ranging between 0.05 and 0.2 second. Propane is cracked at a temperature between 1200° F. and 2400° F. and at a pressure between 5 and 40 p. s. i. a. while maintaining the gas at those conditions for a contact time of between 0.002 and 1.5 seconds. Propane is preferably cracked at a pressure between 5 and 25 p. s. i. a. and at a temperature between 1400° F. and 1900° F. while maintaining the gas under those conditions for a period of between 0.07 and 0.5 second.

This system is also used for the purpose of cracking propane to make ethylene as above described in one reaction while cracking propane, butane, or natural gasoline in the presence of steam in another reaction to make water gas.

The length of the pebble bed through which the heating gas is passed may be maintained more uniformly by utilizing a plurality of pebble inlets spaced about over the upper portion of the pebble heater chamber. In connection with such a modification a plurality of pebble outlets are also utilized so that instead of having one large pebble mass capped top and bottom by conical sections there would actually be a plurality of somewhat small conical sections, capping both top and bottom of the fluent pebble mass. When such a modification is utilized with the device shown in Figure 1 of the drawings, a plurality of outlets 14 extend upwardly into chamber 11. Outlets 15 withdraw pebbles from a plurality of points along the bottom surface of the heater chamber. Reaction chambers 18 and 24, are on occasion, modified by providing additional reactant material inlets in the lower portion of those chambers so as to supply a second or additional reactant material to the reaction chamber for reaction therein with the first reactant material. Such a modification is necessary when propane, butane, or natural gasoline is cracked in the presence of steam for the purpose of producing water gas.

The principle of this invention is not limited to the utilization of the two reaction chambers which are discussed above and are shown in the drawings. Additional reaction chambers may also be utilized and pebbles may be drawn from various positions throughout the length of the pebble heater chamber so as to provide pebbles at different temperatures to the various reaction chambers.

Other and further modifications of this invention will be apparent to those skilled in the art upon study of the foregoing disclosure and discussion. These modifications of the invention can be made or followed in the light of this disclosure without departing from the spirit or the scope of such disclosure.

I claim:

1. The process of heating one portion of a continuously flowing mass of pebbles to a high temperature and another portion of said flowing mass to a higher temperature in a single heating zone which comprises the steps of passing pebbles into the upper portion of a pebble heating zone; passing a heating medium into the lower portion of said heating zone and upwardly therethrough in direct heat exchange with said pebbles; removing effluent material from the upper portion of said heating zone; removing a first portion of said pebbles from the bottom of said heating zone; removing a second but cooler portion of said pebbles from a point in said heating zone intermediate its ends; and passing said first and second pebble portions to separate reaction zones.

2. The process of controlling the temperature of pebbles within a pebble reaction zone which comprises the steps of heating a first portion of pebbles in a pebble heating zone; removing said heated pebbles from the lower portion of said heating zone; mixing a cool second portion of pebbles with said heated pebbles from said heating zone; passing said pebble mixture downwardly through a reaction zone; passing reactant materials into the lower portion of said reaction zone and upwardly therethrough and raising said reactant materials to reaction temperature in direct heat exchange with said pebbles; removing effluent materials from the upper portion of said reaction zone; removing pebbles from the lower portion of said reaction zone; passing a first portion of said pebbles from said reaction zone to the upper portion of said heating zone; and passing a second portion of said pebbles from said reaction zone directly to admixture with said heated pebbles downstream of said heating zone.

3. The process of converting ethane and propane to ethylene which comprises the steps of gravitating a fluent mass of pebbles through a heater zone; heating said pebble mass in said heater zone; gravitating a first portion of said pebbles from the lower portion of said heater zone to the upper portion of a first reaction zone at a temperature between 1300° F. and 2500° F.; gravitating a second portion of said pebbles from a position above the withdrawal position of said first pebble portion to the upper portion of a second reaction zone, said second pebble portion being at a temperature below that of said first pebble portion but within the range of from 1200° F. to 2400° F.; passing ethane into the lower portion of said first reaction zone at a pressure between 5 and 40 p. s. i. a.; passing said ethane upwardly through said first reaction zone and in direct heat exchange with said first portion of heated pebbles which flow downwardly therethrough, at a rate such that the contact time between said ethane and said first portion of heated pebbles ranges between 0.001 and 1.0 second, whereby said ethane is at least partly converted to ethylene; passing propane into the lower portion of said second reaction zone at a pressure between 5 and 40 p. s. i. a.; passing said propane upwardly through said second reaction zone and in direct heat exchange with said second portion of heated pebbles which flow downwardly therethrough, at a rate such that the contact time between said propane and said second portion of heated pebbles ranges between 0.002 and 1.5 seconds, whereby said propane is at least partly converted to ethylene; removing reaction products from the upper portion of said first and second reaction zones; gravitating pebbles from said first and second reaction zones to an elevation zone; elevating said pebbles to the upper portion of said heater zone; and maintaining said pebbles in a contiguous state from the upper portion of said heater zone to the lower portion of said reaction zones.

4. The process of converting ethane and propane to ethylene which comprises the steps of gravitating a fluent mass of pebbles through a heater zone; heating said pebble mass in said heater zone; gravitating a first portion of said pebbles from the lower portion of said heater zone to the upper portion of a first reaction zone at a temperature between 1500° F. and 2000° F.; gravitating a second portion of said pebbles from a position above the withdrawal position of said first pebble portion to the upper portion of a second reaction zone, said second pebble portion being at a temperature below that of said first pebble portion but within the range of from 1400° F. to 1900° F.; passing ethane into the lower portion of said first reaction zone at a pressure between 5 and 25 p. s. i. a.; passing said ethane upwardly through said first reaction zone and in direct heat exchange with said first portion of heated pebbles which flow downwardly therethrough, at a rate such that the contact time between said ethane and said first portion of heated pebbles ranges between 0.05 and 0.2 second, whereby said ethane is at least partly converted to ethylene; passing propane into the lower portion of said second reaction zone at a pressure between 5 and 25 p. s. i. a.; passing said propane upwardly through said second reaction zone and in direct heat exchange with said second portion of heated pebbles which flow downwardly therethrough, at a rate such that the contact time between said propane and said second portion of heated pebbles ranges between 0.07 and 0.5 second, whereby said propane is at least partly converted to ethylene; removing reaction products from the upper portion of said first and second reaction zones; gravitating pebbles from said first and second reaction zones to an elevation zone; elevating said pebbles to the upper portion of said heater zone; and maintaining said pebbles in a contiguous state from the upper portion of said heater zone to the lower portion of said reaction zones.

5. The process of simultaneously carrying on two reactions under different conditions which comprises the steps of gravitating a fluent mass of pebbles through a heater zone; heating said pebble mass in said heater zone; gravitating a first portion of said heated pebbles from the lower portion of said heater zone to the upper portion of a first reaction zone; gravitating a second portion of said heated pebbles from a position above the withdrawal position of said first heated pebble portion to the upper portion of a second reaction zone, said second pebble portion being at a temperature below that of said first pebble portion; passing a first reactant material into the lower portion of said first reaction zone and upwardly therethrough in direct heat exchange with said heated pebbles therein; passing a second reactant material into the lower portion of said second reaction zone and upwardly therethrough in direct heat exchange with said second pebble portion therein; removing reaction products from the upper portion of said first and second reaction zones; gravitating pebbles from the lower portion of said first and second reaction zones to an elevation zone; elevating said pebbles to the upper portion of said heater zone; and maintaining said pebbles in a contiguous state from the upper portion of said heater zone to the lower portions of said reaction zones.

6. The process of simultaneously carrying on two reactions under different conditions which comprises the steps of gravitating a fluent mass of pebbles through a heater zone; heating said pebble mass as it gravitates in said heater zone; progressively gravitating said heated pebbles from said heated zone; passing a first portion of said heated pebbles from the bottom of said heated zone into the upper portion of a first reaction zone; passing a second less progressively heated portion of said heated pebbles from an intermediate portion of said heater zone into the upper portion of a second reaction zone at a temperature lower than that of said first pebble portion; passing a first reactant material into the lower portion of said first reaction zone and upwardly therethrough in direct heat exchange with said heated pebbles therein; passing a second reactant material into the lower portion of said second reaction zone and upwardly therethrough in direct heat exchange with said second pebble portion therein; removing reaction products from the upper portion of said first and second reaction zones; gravitating pebbles from the lower portion of said first and second reaction zones to an elevation zone; elevating said pebbles to the upper portion of said heater zone; and maintaining said pebbles in a contiguous state from the upper portion of said heater zone to the lower portions of said reaction zones.

7. The process of simultaneously carrying on two reactions under different conditions which comprises the steps of gravitating a fluent mass of pebbles through a heater zone; heating said pebble mass in said heater zone; gravitating a first portion of said heated pebbles from the lower portion of said heater zone to a mixing zone; mixing cooler pebbles with said first portion of pebbles in said mixing zone; gravitating said pebble mixture from said mixing zone to the upper portion of a first reaction zone; gravitating a second portion of said heated pebbles from the lower portion of said heating zone to the upper portion of a second reaction zone, said pebbles gravitated to said second reaction zone being at a temperature above that of pebbles gravitated to said first reaction zone; passing a first reactant material into the lower portion of said first reaction zone and upwardly therethrough in direct heat exchange with said heated pebbles therein; passing a second reactant material into the lower portion of said second reaction zone and upwardly therethrough in direct heat exchange with said second pebble portion therein; removing reaction products from the upper portion of said first and second reaction zones; gravitating pebbles from the lower portion of said first and second reaction zones to an elevation zone; withdrawing a first portion of said pebbles from said elevation zone; passing said withdrawn pebbles directly to said mixing zone; passing the remaining said pebbles to the upper portion of said heater zone; and maintaining said pebbles in a contiguous state from the upper portion of said heater zone to the lower portions of said reaction zones.

8. A process for simultaneously carrying on two reactions under different conditions which comprises the steps of gravitating a fluent mass of pebbles through a heater zone; passing a hot gaseous material into the lower portion of said heater zone and upwardly therethrough in direct heat exchange with said fluent pebble mass, whereby said pebbles are raised to a high temperature; removing effluent material from the upper portion of said heater zone; gravitating a first portion of said heated pebbles from the lower portion of said heater zone to the upper portion of a first reaction zone; gravitating a second portion of said heated pebbles from a position above the withdrawal position of said first heated pebble portion to the upper portion of a second reaction zone, said pebble portion being at a temperature below that of said first pebble portion; passing a first reactant material into the lower portion of said first reaction zone and upwardly therethrough in direct heat exchange with said heated pebbles therein; passing a second reactant material into the lower portion of said second reaction zone and upwardly therethrough in direct heat exchange with said second pebble portion therein; removing reaction products from the upper portion of said first and second reaction zones; gravitating pebbles from the lower portion of said first and second reaction zones to an elevation zone; elevating said pebbles to the upper portion of said heater zone; and maintaining said pebbles in a contiguous state from the upper portion of said heater zone to the lower portions of said reaction zones.

9. The process of simultaneously carrying on two reactions under different conditions which comprises the steps of gravitating a fluent mass of pebbles through a heater zone; passing fuel material into the lower portion of said heater zone; burning said fuel material on the surface of said pebbles; passing resulting hot combustion gas upwardly in direct heat exchange with said pebble mass in said heater zone; removing effluent material from the upper portion of said heater zone; gravitating a first portion of said heated pebbles from the lower portion of said heater zone to the upper portion of a first reaction zone; gravitating a second portion of said heated pebbles from a position above the withdrawal position of said first heated pebble portion to the upper portion of a second reaction zone, said second pebble portion being at a different temperature than that of said first pebble portion; passing a first reactant material into the lower portion of said first reaction zone and upwardly therethrough in direct heat exchange with said heated pebbles therein; passing a second reactant material into the lower portion of said second reaction zone and upwardly therethrough in direct heat exchange with said second pebble portion therein; removing reaction products from the upper portion of said first and second reaction zones; gravitating pebbles from the lower portion of said first and second reaction zones to an elevation zone; elevating said pebbles to the upper portion of said heater zone; and maintaining said pebbles in a contiguous state from the upper portion of said heater zone to the lower portions of said reaction zones.

10. The process of claim 9, wherein a portion of said fuel is burned on the surface of said first portion of pebbles; and a portion of fuel is burned on the surface of said second portion of pebbles.

11. A pebble heater apparatus for simultaneously carrying on reactions under two sets of conditions which comprises in combination a heater chamber having a pebble inlet and an effluent outlet in its upper portion; heating material inlet means in the lower portion of said heater chamber; first pebble outlet means extending through the bottom portion of said heater chamber upwardly therein to a point intermediate the ends of said chamber; second pebble outlet means in the bottom of said heater chamber; a first reaction chamber; pebble inlet means and product outlet means in the upper portion of said first reaction chamber; first pebble conduit means extending between said first pebble outlet means in said heater chamber and said pebble inlet means in said first reaction chamber; pebble outlet means and reactant material inlet means in the lower portion of said first reaction chamber; a second reaction chamber; pebble inlet means and product outlet means in the upper portion of said second reaction chamber; second pebble conduit means extending between said second pebble outlet means in said heater chamber and said pebble inlet means in said second reaction chamber; pebble outlet means and reactant material inlet means in the lower portion of said second reaction chamber; elevator means; pebble conduit means extending between the lower portion of said elevator means and said pebble outlet means in the lower portion of said first and second reaction chambers; and pebble conduit means extending between the upper portion of said elevator means and said pebble inlet means in said heater chamber.

12. The process of simultaneously carrying on two reactions under different conditions which comprises the steps of gravitating a fluent mass of pebbles through a heater zone; heating said pebble mass in said heater zone; gravitating said pebbles from said heater zone; gravitating a first portion of said pebbles to the upper portion of a first reaction zone; gravitating a second portion of said heated pebbles at the temperature lower than that of said first portion of heated pebbles to the upper portion of a second reaction zone; passing a first reactant material into the lower portion of said first reaction zone and upwardly therethrough in direct heat exchange with said heated pebbles therein; passing a second reactant material into the lower portion of said second reaction zone and upwardly therethrough in direct heat exchange with said second pebble portion therein; removing reaction products from the upper portion of said first and second reaction zones; gravitating pebbles from the lower portion of said first and second reaction zones to an elevation zone; elevating said pebbles to the upper portion of said heater zone; and maintaining said pebbles in a contiguous state from the upper portion of said heater zone to the lower portion of said reaction zones.

WALTER A. GOLDTRAP.

References Cited in the file of this patent

UNITED STATES PATENTS

| Number | Name | Date |
|---|---|---|
| 2,396,709 | Leffer | Mar. 19, 1946 |
| 2,409,353 | Giuliani et al. | Oct. 15, 1946 |
| 2,432,520 | Ferro | Dec. 16, 1947 |
| 2,432,873 | Ferro et al. | Dec. 16, 1947 |
| 2,443,714 | Arveson | June 22, 1948 |
| 2,448,257 | Evans | Aug. 31, 1948 |
| 2,468,712 | Kohler | Apr. 26, 1949 |
| 2,490,336 | Crolley | Dec. 6, 1949 |
| 2,491,446 | Hagerbaumer | Dec. 13, 1949 |
| 2,493,218 | Bergstrom | Jan. 3, 1950 |
| 2,530,274 | Weber | Nov. 14, 1950 |
| 2,567,207 | Hoge | Sept. 11, 1951 |